(12) United States Patent
Quest

(10) Patent No.: US 11,988,425 B2
(45) Date of Patent: May 21, 2024

(54) DETECTION THAT A REFRIGERANT IS AT A FULLY CHARGED LEVEL

(71) Applicant: AC AVALANCHE LLC, Valley View, OH (US)

(72) Inventor: Michael E. Quest, Brentwood, TN (US)

(73) Assignee: AC AVALANCHE LLC, Valley View, OH (US)

( * ) Notice: Subject to any disclaimer, the term of this patent is extended or adjusted under 35 U.S.C. 154(b) by 0 days.

(21) Appl. No.: 16/945,843

(22) Filed: Aug. 1, 2020

(65) Prior Publication Data

US 2020/0370806 A1  Nov. 26, 2020

Related U.S. Application Data

(63) Continuation-in-part of application No. 15/332,716, filed on Oct. 24, 2016, now abandoned.

(60) Provisional application No. 62/245,451, filed on Oct. 23, 2015.

(51) Int. Cl.
| | |
|---|---|
| *F25B 45/00* | (2006.01) |
| *F24F 11/526* | (2018.01) |
| *F24F 11/58* | (2018.01) |
| *F25B 49/00* | (2006.01) |

(52) U.S. Cl.
CPC ............ *F25B 45/00* (2013.01); *F24F 11/526* (2018.01); *F24F 11/58* (2018.01); *F25B 49/005* (2013.01); *F25B 2345/003* (2013.01); *F25B 2700/21* (2013.01)

(58) Field of Classification Search
CPC ................. B60H 1/00585; B60H 1/00978

USPC .................................................. 62/77
See application file for complete search history.

(56) References Cited

U.S. PATENT DOCUMENTS

| | | | | |
|---|---|---|---|---|
| 5,478,505 | A * | 12/1995 | McElfresh | A61L 9/122 239/57 |
| 7,845,305 | B2 * | 12/2010 | Linke | G01K 11/12 374/162 |
| 8,322,151 | B1 * | 12/2012 | Garofalo | F25B 49/00 62/149 |
| 9,933,318 | B2 | 4/2018 | Quest | |
| 10,173,492 | B2 | 1/2019 | Quest | |
| 2005/0262855 | A1 * | 12/2005 | Hsieh | B60H 1/00585 62/149 |
| 2012/0046792 | A1 * | 2/2012 | Secor | F24F 11/56 702/45 |
| 2013/0245965 | A1 * | 9/2013 | Kane | F24F 11/30 702/33 |

(Continued)

*Primary Examiner* — Steve S Tanenbaum

(57) ABSTRACT

A system for indicating on an electronic device that the refrigerant being introduced by a user to an air conditioning system has reached its optimum fill level includes a sensor device having a main body, the sensor device being structured and disposed for measuring a range of data; a wireless transmitter on the sensor device, the wireless transmitter being in communication with the electronic device for wirelessly transmitting the range of data to the electronic device; an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value.

7 Claims, 3 Drawing Sheets

(56) References Cited

U.S. PATENT DOCUMENTS

2014/0299289 A1\* 10/2014 Alsaleem .............. F24H 15/204
  165/11.1
2014/0334525 A1\* 11/2014 Arensmeier ............. G01K 7/22
  374/100

\* cited by examiner

DETECTION THAT A REFRIGERANT IS AT A FULLY CHARGED LEVEL

This application is a Continuation-In-Part application of U.S. Non-Provisional patent application Ser. No. 15/332,716 filed on Oct. 24, 2016, which claims priority to and incorporates entirely by reference U.S. Provisional Patent Application Ser. No. 62/245,451 filed on Oct. 23, 2015.

FIELD OF THE INVENTION

This invention relates to a device for indicating the output temperature of an air conditioning unit and, more particularly, to a sensor device securable in or adjacent to a vent for sensing one or more temperature output ranges and transmitting the one or more temperature output ranges to an electronic device.

DISCUSSION OF THE RELATED ART

For many years, automobile air conditioners have included an orifice tube or expansion valve. Because an expansion valve is essentially a fixed valve with free flow of the refrigerant, the pressure as measured on both the high and low side is a function of both the amount of refrigerant therein, as well as the ambient temperature. A suitable pressure range for the correct refrigerant fill was established many years ago, which is based on increasing the pressure as the ambient temperature rises. More recently, automobile manufacturers have started using thermostatic expansion valves that are designed to meter, or restrict, the flow of refrigerant into the evaporator, thereby providing more efficient cooling by controlling the super heating at the evaporator outlet. The control of the metering is located at the outlet of the evaporator. These automobile manufacturers use the evaporator outlet temperature, independent of the ambient temperature, to regulate the thermostatic expansion valves, which meters the refrigerant flow and sets a maximum predetermined pressure at the evaporator outlet.

For systems using a thermostatic expansion valve, as refrigerant is added during servicing, the pressure on the low side rises until it reaches this predetermined maximum level. If this pressure level is below the gauge's established correct fill range, even if the system is fully charged, adding additional refrigerant will not bring the pressure reading up to gauge's established fully charge pressure reading. As additional refrigerant is added, the excessive pressure builds up on the high side and can only be measured using a high side gauge. Because the fully charged pressure using a thermostatic expansion valve remains constant and the gauge's fully charged requirement rises as the ambient temperature goes up, the higher the ambient temperature the larger the gap between the system being fully charged and it showing fully charged on the low side gauge. In these cases, using only a low side gauge can potentially cause too much refrigerant to be added and result in damage to the compressor or other problems associated with overcharging.

In light of the problems advanced above, there exists a need for a device for sensing one or more temperature output ranges and transmitting the one or more temperature output ranges to an electronic device for visually indicating when the correct amount of refrigerant has been introduced to an air conditioning system and preventing the problems associated with overfilling an air conditioner with refrigerant.

SUMMARY OF THE INVENTION

In accordance with one form of the present invention, there is provided a system for indicating on an electronic device that the refrigerant in an air conditioning system has reached a fully charged fill level, the system including a sensor device, including a main body, to measure temperatures in a range of temperatures; a wireless transmitter on the sensor device, the wireless transmitter being in communication with the electronic device for wirelessly transmitting the range of data to the electronic device; at least one fastener on the main body, the at least one fastener having a plurality of serrations at a distal end; the at least one fastener being sized and configured for securing the main body directly on a vane of a vent of the air conditioning system; an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value.

In accordance with another form of the present invention, there is provided a system for indicating on an electronic device that the refrigerant in an air conditioning system has reached a fully charged fill level, the system including a temperature sensor, including a main body; a wireless transmitter on the sensor device, the wireless transmitter being in communication with the electronic device for wirelessly transmitting a range of data to the electronic device; at least one fastener on the main body, the at least one fastener having a plurality of serrations at a distal end; the at least one fastener being sized and configured for securing the main body directly on a vane of a vent of the air conditioning system; an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value.

BRIEF DESCRIPTION OF THE DRAWINGS

For a fuller understanding of the nature of the present invention, reference should be made to the following detailed description, taken in conjunction with the accompanying drawings in which.

Like reference numerals refer to like parts throughout the several views of the drawings.

DETAILED DESCRIPTION OF THE PREFERRED EMBODIMENTS

Referring to the several views of the drawings, the sensor device for sensing one or more temperature output ranges and transmitting the one or more temperature output ranges to an electronic device 100 for visually indicating to a user that the refrigerant being introduced to an air conditioning system has reached its fill level is generally referred to as the sensor device 10.

Figure 1:
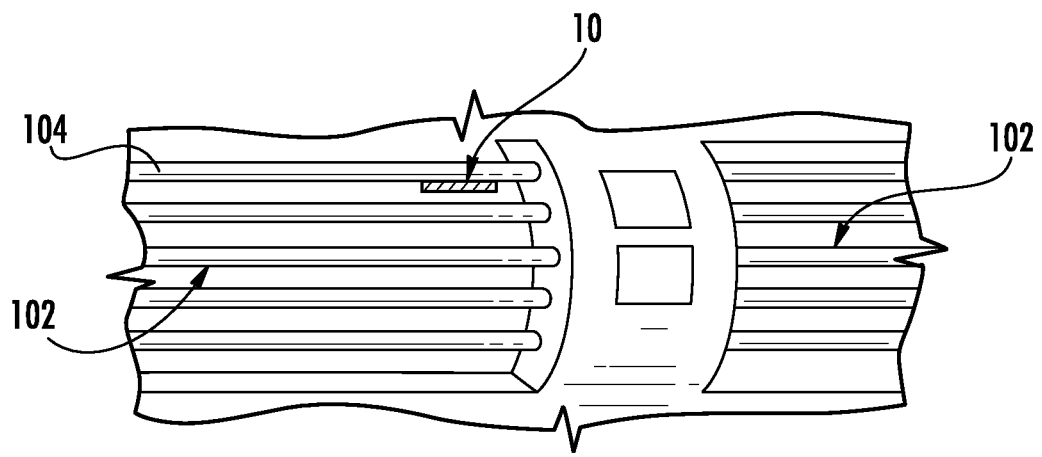
FIG. 1 is a perspective view of the sensor device in accordance with one embodiment, shown secured to a vent.
Figure 4:
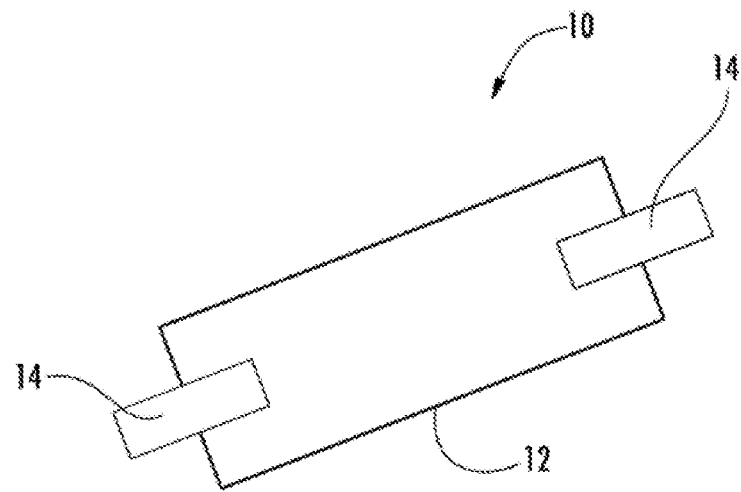
FIG. 4 is a perspective view of the sensor device showing the bottom side of the sensor device in accordance with one embodiment.

Referring to FIG. 1, a first embodiment of the sensor device 10 is shown, wherein the sensor device 10 includes a wireless transmitter 12 and is configured to be secured to a vent 102, such as the air vent vane 104 on an automobile air conditioning vent 102, using a fastener 14 (see FIG. 4). Exemplary embodiments of the fastener 14 include snap-fit fasteners, hook and loop fasteners, adhesive fasteners, and magnetic fasteners. In one embodiment, the sensor device 10 includes a temperature sensor for measuring a range of temperatures between minus-20 degrees Fahrenheit (−20° F.) and 150 degrees Fahrenheit (150° F.) in real time with an accuracy variable not exceeding 2 degrees Fahrenheit (2° F.). In one embodiment, the temperature sensor is located approximately 19 mm from the PCB & electronics forming the sensor device 10.

Figure 2:
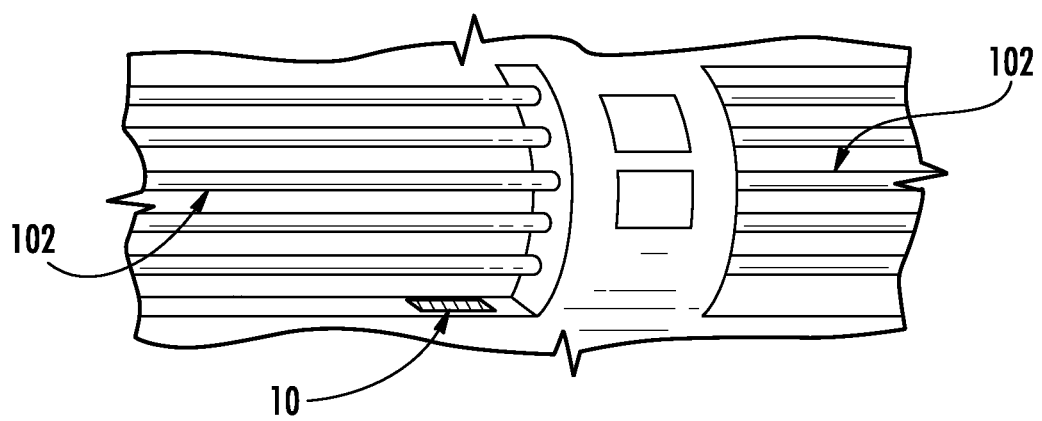
FIG. 2 is a perspective view of the sensor device in accordance with one embodiment, shown secured to the inner facing wall of a vent channel.

Referring to FIG. 2, another embodiment of the sensor device 10 is shown, wherein the sensor device 10 is configured to be secured near a vent 102, such as an automobile air conditioning vent, such as on the inner facing surface of the vent channel of vent 102 by a fastener 14. Exemplary embodiments of the fastener 14 include snap-fit fasteners, hook and loop fasteners, adhesive fasteners, and magnetic fasteners. In one embodiment, the sensor device 10 measures a range of temperatures between minus-20 degrees Fahrenheit (−20° F.) and 150 degrees Fahrenheit (150° F.) in real time with an accuracy variable not exceeding 2 degrees Fahrenheit (2° F.). In one embodiment, at least a portion of the sensor device 10 is manufactured with thermochromic ink to visually indicate refrigerant charge by changing color.

Figure 3:
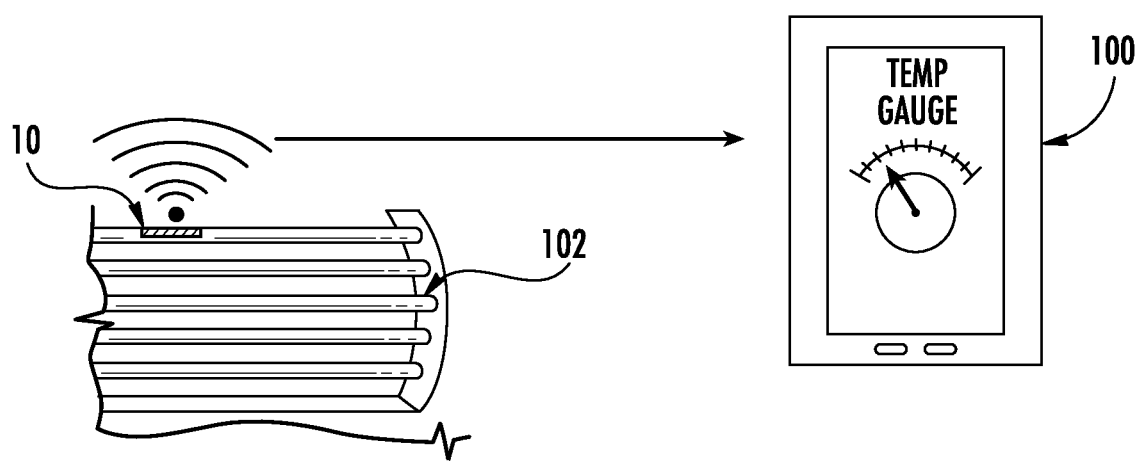
FIG. 3 is a perspective view of an electronic device receiving a transmission from the sensor device.

Referring to FIG. 3, the sensor device 10 is shown in conjunction with an electronic device 100. In one embodiment, a software application is provided for downloadable use on the electronic device 100. Without limiting the features therein, the software application is structured and disposed for displaying the temperature transmitted by the sensor device 10 on the screen of the electronic device 100. In one embodiment, the electronic device 100 accesses a website on the World Wide Web which provides a web application for displaying the temperature transmitted by the sensor device 10 on the screen of the electronic device 100.

Figure 5:
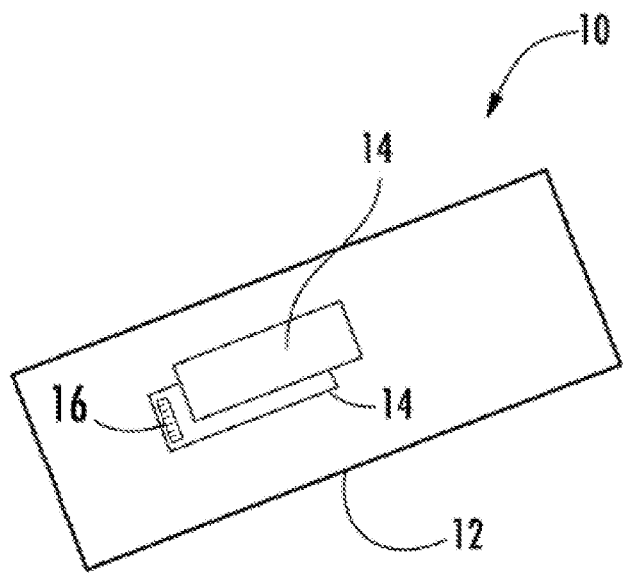
FIG. 5 is a perspective view of the sensor device showing the bottom side of the sensor device in accordance with one embodiment.

Referring now to FIG. 5, in accordance with one embodiment, the fasteners 14 have a plurality of serrations 16 at the far end and they close completely at the end with a rounded point. In one embodiment, the fasteners are 12 mm long and the plurality of serrations is six serrations 16. Behind the serrations the clips increase in width. Different vehicles have varyingly sized vent vanes 104 (e.g., some are thick; some are airfoil). The plurality of serrations 16 and progressive increase in width of the fasteners permits use the device 10 across a considerable spectrum of automobile types. Moreover, the design prevents the device 10 from being blown off the vane 104 by airflow during the charging process.

In a preferred embodiment, the software application or web application visually and/or audibly indicates to a user through the electronic device 100 when the temperature cools to a predetermined temperature value selected for indicating that the refrigerant has reached its fully charged, optimum fill level within the air conditioning system. Each of the above predetermined temperature values may be determined using established pressure levels for indicating the fill level of refrigerant as measured by low-side and high-side pressure gauges. By way of a non-limiting example, the software application or web application may be structured and disposed to visually and/or audibly deliver an indication through the electronic device 100 at a temperature of 50° F. or lower.

In operation, as refrigerant is introduced to the air conditioning system, cold air flows through the air vents 102 at a rate as selectively determined by a user. It is preferable for the air vent 102 to be set to permit cold airflow through the air vent 102 at its highest setting in order to most effectually determine when the refrigerant has reached the optimum fill level. As the refrigerant approaches optimum fill level, the air flowing through the air vent will become colder and the software application or web application causes the electronic device 100 to visually and/or audibly indicate such to the user.

While the present invention has been shown and described in accordance with several preferred and practical embodiments, it is recognized that departures from the instant disclosure are contemplated within the spirit and scope of the present invention.

What is claimed is:

1. A system for indicating on an electronic device that the refrigerant being introduced in an automobile or vehicle air conditioning system has reached a fully charged fill level, said system comprising:
   a sensor, including a main body, electronics operating the sensor, and a temperature sensor spaced approximately 19 mm from the electronics for measuring a real time temperature of air flowing through a vent of the automobile or vehicle air conditioning system, the temperature sensor measuring temperatures in a range of temperatures between minus-20 degrees Fahrenheit (−20° F.) and 150 degrees Fahrenheit (150° F.) with an accuracy variable not exceeding 2 degrees Fahrenheit (2° F.);
   a wireless transmitter on said sensor, said wireless transmitter being in communication with the electronic device for wirelessly transmitting said real time temperature to the electronic device;
   at least one fastener on said main body, said at least one fastener having a plurality of serrations at a distal end;
   said at least one fastener being sized and configured for securing said main body directly on a vane of a vent of the automobile or vehicle air conditioning system, and the vent is set for cold airflow through the vent at its highest setting;
   an electronic application configured for use with the electronic device, and the electronic application for use on the electronic device is accessible via a website on the World Wide Web; and
   wherein said electronic application is structured and disposed for visually indicating to the user via the electronic device the transmitted real time temperature in real time to the user via the electronic device when the transmitted real time temperature reaches a predetermined value and the amount of refrigerant introduced has reached the fully charged fill level.

2. A system for indicating on an electronic device of an automobile owner that the refrigerant being introduced in an automobile or vehicle air conditioning system has reached a fully charged fill level, said system comprising:
   a sensor, including a main body, electronics operating the sensor, and a temperature sensor spaced approximately 19 mm from the electronics for measuring a real time temperature of air flowing through a vent of the automobile or vehicle air conditioning system, the temperature sensor measuring temperatures in a range of temperatures between minus −20 degrees Fahrenheit (−20°

F.) and 150 degrees Fahrenheit (150° F.) with an accuracy variable not exceeding 2 degrees Fahrenheit (2° F.);

a wireless transmitter on said sensor, said wireless transmitter being in communication with the electronic device for wirelessly transmitting said real time temperature to the electronic device;

at least one fastener on said main body, said at least one fastener having a plurality of serrations at a distal end;

said at least one fastener being sized and configured for securing said main body directly on a vane of a vent of the automobile or vehicle air conditioning system, and the vent is set for cold airflow through the vent at its highest setting;

an electronic application configured for use with the electronic device, and the electronic application is a downloadable software application; and wherein said electronic application is structured and disposed for visually indicating to the user via the electronic device the transmitted real time temperature in real time when the transmitted real time temperature reaches a predetermined value and the correct amount of refrigerant introduced has reached the fully charged fill level.

3. The system as recited in claim 2 wherein a portion of said temperature sensor is manufactured with thermochromic ink.

4. A system for indicating on an electronic device that the refrigerant being introduced in an automobile or vehicle air conditioning system has reached a fully charged fill level, the system comprising:

a sensor, including a main body, electronics operating the sensor, and a temperature sensor spaced approximately 19 mm from the electronics for measuring a real time temperature of air flowing through a vent of the automobile or vehicle air conditioning system;

a wireless transmitter on the sensor, the wireless transmitter being in communication with the electronic device for wirelessly transmitting a range of real time temperature data from the temperature sensor to the electronic device;

at least one fastener on said main body;

said at least one fastener on said main body being sized and configured for securing said main body directly on a vent channel of the vent of the automobile or vehicle air conditioning system, and the vent of the automobile or vehicle air conditioning system is set for cold airflow through the vent at its highest setting;

an electronic application configured for use with the electronic device; and wherein the electronic application is structured and disposed for visually indicating to the user via the electronic device the transmitted range of data in real time and audibly indicating to the user via the electronic device when the transmitted range of data reaches a predetermined value and the amount of refrigerant introduced has reached the fully charged fill level.

5. The system as recited in claim 4 wherein the temperature sensor is structured and disposed for measuring temperatures between minus-20 degrees Fahrenheit (−20° F.) and 150 degrees Fahrenheit (150° F.) with an accuracy variable not exceeding 2 degrees Fahrenheit (2° F.).

6. The system as recited in claim 4 wherein the electronic application for use on the electronic device is a downloadable software application.

7. The system as recited in claim 4 wherein the electronic application for use on the electronic device is accessible via a website on the World Wide Web.

\* \* \* \* \*